(12) United States Patent
Kong et al.

(10) Patent No.: US 12,487,619 B2
(45) Date of Patent: Dec. 2, 2025

(54) LDO OUTPUT POWER-ON GLITCH REMOVAL CIRCUIT

(71) Applicant: Skyworks Solutions, Inc., Irvine, CA (US)

(72) Inventors: Lynn Yun Kong, Lexington, MA (US); Yi Yang, Malden, MA (US); Bo Zhou, Acton, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 280 days.

(21) Appl. No.: 18/109,805

(22) Filed: Feb. 14, 2023

(65) Prior Publication Data

US 2023/0280774 A1    Sep. 7, 2023

Related U.S. Application Data

(60) Provisional application No. 63/310,380, filed on Feb. 15, 2022.

(51) Int. Cl.
*G05F 1/575* (2006.01)
*G05F 1/46* (2006.01)
*G05F 1/571* (2006.01)
*G05F 3/26* (2006.01)

(52) U.S. Cl.
CPC .............. *G05F 1/575* (2013.01); *G05F 1/468* (2013.01); *G05F 1/571* (2013.01); *G05F 3/262* (2013.01)

(58) Field of Classification Search
CPC ........... G05F 1/571; G05F 1/573; G05F 1/575
See application file for complete search history.

(56) References Cited

U.S. PATENT DOCUMENTS

| 9,812,958 | B2 * | 11/2017 | Utsunomiya | ........... G05F 1/565 |
| 11,749,317 | B2 * | 9/2023 | Chuang | ................... G11C 5/148 |
| | | | | 323/280 |
| 2005/0248331 | A1 | 11/2005 | Whittaker | |
| 2006/0038709 | A1 | 2/2006 | Lu et al. | |
| 2008/0079501 | A1 | 4/2008 | Hulfachor | |
| 2008/0203478 | A1 | 8/2008 | Prikhodko et al. | |
| 2010/0181972 | A1 * | 7/2010 | Kawagoshi | ............. G05F 1/571 |
| | | | | 323/269 |
| 2010/0201331 | A1 * | 8/2010 | Imura | ....................... G05F 1/56 |
| | | | | 323/234 |
| 2010/0229143 | A1 | 9/2010 | Shi | |

(Continued)

FOREIGN PATENT DOCUMENTS

| CN | 109428487 B | * | 12/2023 | ............... H02M 1/08 |
| WO | WO-2019119264 A1 | * | 6/2019 | ............... G05F 1/56 |

*Primary Examiner* — Sisay G Tiku

(74) *Attorney, Agent, or Firm* — Knobbe, Martens, Olson & Bear, LLP

(57) ABSTRACT

A voltage regulator circuit for supplying a voltage to an input of a subsequent circuit element, the voltage regulator circuit comprising: a power supply, an output adapted to deliver a regulated output voltage, a first transistor connected between the power supply and the output for controlling the output voltage, a differential amplifier configured to provide a feedback to the first transistor, a protective circuit which is coupled to the gate of the first transistor and configured to control the first transistor, such that the turn-on of the first transistor is delayed and any overshoot output voltage is avoided at the output during an initial charging up phase after the power supply is turned on.

21 Claims, 10 Drawing Sheets

(56) References Cited

U.S. PATENT DOCUMENTS

| | | |
|---|---|---|
| 2010/0253397 A1 | 10/2010 | Badillo |
| 2012/0019288 A1 | 1/2012 | Badillo |
| 2012/0098333 A1 | 4/2012 | Zhou et al. |
| 2014/0070778 A1* | 3/2014 | Nihei .............. G05F 1/571 323/271 |
| 2015/0326204 A1 | 11/2015 | Cho et al. |
| 2016/0126832 A1 | 5/2016 | Zhou et al. |
| 2016/0127008 A1 | 5/2016 | Obkircher et al. |
| 2016/0291620 A1 | 10/2016 | Zhou et al. |
| 2017/0033771 A1 | 2/2017 | Cho et al. |
| 2017/0033772 A1 | 2/2017 | Domino |
| 2017/0052553 A1 | 2/2017 | Gebeyehu et al. |
| 2017/0077916 A1 | 3/2017 | Zhou |
| 2017/0077982 A1 | 3/2017 | Obkircher et al. |
| 2017/0163218 A1 | 6/2017 | Gorbachov et al. |
| 2017/0279483 A1 | 9/2017 | Obkircher et al. |
| 2017/0300076 A1 | 10/2017 | Liang et al. |
| 2018/0034661 A1 | 2/2018 | Zhou et al. |
| 2018/0047670 A1 | 2/2018 | Zhou |
| 2018/0120881 A1 | 5/2018 | Gebeyehu et al. |
| 2018/0151240 A1 | 5/2018 | Zhou et al. |
| 2018/0158533 A1 | 6/2018 | Zhou et al. |
| 2018/0336955 A1 | 11/2018 | Zhou et al. |
| 2019/0027333 A1 | 1/2019 | Zhou et al. |
| 2019/0165747 A1 | 5/2019 | Couglar et al. |
| 2019/0180833 A1 | 6/2019 | Zhou et al. |
| 2019/0196525 A1 | 6/2019 | Zhou |
| 2019/0229682 A1 | 7/2019 | Gorbachov et al. |
| 2019/0243403 A1 | 8/2019 | Gebeyehu et al. |
| 2019/0295672 A1 | 9/2019 | Zhou et al. |
| 2019/0318793 A1 | 10/2019 | Zhou et al. |
| 2019/0354126 A1* | 11/2019 | Ogura .............. G05F 1/571 |
| 2020/0091902 A1 | 3/2020 | Zhou et al. |
| 2020/0161965 A1 | 5/2020 | Zhou et al. |
| 2020/0272182 A1 | 8/2020 | Liang et al. |
| 2020/0350247 A1 | 11/2020 | Zhou et al. |
| 2020/0401177 A1 | 12/2020 | Liang et al. |
| 2021/0175038 A1 | 6/2021 | Zhou |
| 2022/0004213 A1 | 1/2022 | Zhou |
| 2022/0187861 A1 | 6/2022 | Zsolczai et al. |
| 2022/0187862 A1 | 6/2022 | Onódy et al. |
| 2022/0253081 A1 | 8/2022 | Liang et al. |
| 2022/0334606 A1 | 10/2022 | Liang et al. |
| 2022/0336178 A1 | 10/2022 | Zhou |
| 2022/0351756 A1* | 11/2022 | Chuang .............. G05F 1/461 |
| 2022/0413533 A1 | 12/2022 | Liang et al. |
| 2023/0006055 A1 | 1/2023 | Kwok et al. |
| 2023/0006056 A1 | 1/2023 | Kwok et al. |
| 2023/0085532 A1 | 3/2023 | Zhou et al. |
| 2023/0100609 A1 | 3/2023 | Liang et al. |
| 2023/0104495 A1 | 4/2023 | Kong et al. |
| 2023/0130733 A1* | 4/2023 | Zhang .............. G05F 3/26 323/274 |

* cited by examiner

LDO OUTPUT POWER-ON GLITCH REMOVAL CIRCUIT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to a voltage regulator circuit. Embodiments of the invention also relate to a method of controlling a voltage regulator circuit for supplying a voltage to an input of a subsequent circuit element.

Description of the Related Technology

The disclosed technology relates to a low-dropout (LDO) regulator circuit. A voltage regulator is an important part of most power supplies that regulates the output voltage and maintain the voltage within a specified range.

FIG. 1 shows an electric circuit of a conventional LDO circuit 100, comprising a supply voltage ($V_{DD}$) 101, a differential amplifier (also called error amplifier) 102, a power transistor (also called series pass transistor)103, an output voltage ($V_{output}$) 106, and two resistors (R1 and R2) as a voltage divider. The power transistor 103 may be a p-channel field effect transistor (PFET). The differential amplifier 102 may be an operational amplifier (op amp). One input of the op amp 102 monitors the fraction of the output voltage determined by the resistor ratio of R1 and R2, referred to as $V_{IN}$ (or $V_{feedback}$) 105. The second input to the op amp is from a fixed voltage reference $V_{REF}$ 104 (e.g. a bandgap reference). The output of the op amp ($V_{OUT}$) is connected to the gate of the power transistor 103, in order to control $V_{output}$ 106 of the LDO circuit 100. The main conduction path of the power transistor 103 is connected in a path between the input $V_{DD}$ 101 and the $V_{output}$ 106 of the LDO circuit 100.

When operating, the voltage divider consisting of R1 and R2 forms a feedback loop with the op amp 102 and the $V_{output}$ of the LDO circuit 106. The voltage divider provides a feedback voltage served as $V_{feedback}$ 105 of the op amp 102 which is proportional to the output voltage $V_{OUT}$ of the op amp. The op amp compares $V_{feedback}$ 105 and $V_{REF}$ 104. As the output of the op amp always attempts to make the voltage difference between the inputs zero, the output $V_{OUT}$ of op amp is changed which provides a corresponding output control signal to the gate of the power transistor 106 connected to $V_{OUT}$. Accordingly, the power transistor 103 conducts either more or less current through its conduction path between the $V_{DD}$ 101 and the $V_{output}$ 106 of the LDO circuit. As a result, the $V_{output}$ 106 of the LDO circuit 100 is increased or decreased according to the difference between $V_{feedback}$ 105 and $V_{REF}$ 104 to keep the output voltage constant.

The output of the voltage regulator may be connected to a subsequent electronic circuit or electronic device. When the required (operating) voltage of the subsequent circuit is lower than the maximum rated power for the power available at the output, a situation can arise in which after the voltage regulator is turned on, the output voltage provided by the voltage regulator is instantaneously too high before settling back to the desired output voltage. The instantaneous over-voltage may damage the connected subsequent electronic circuit, leading to decreased reliability or outright failure. Therefore, it is important to regulate the voltage in a lower range of supply voltages to be output to the subsequent circuit.

Conventionally-used LDO regulators may have problems when the supply voltage is charged from 0V to $V_{DD}$, as the output of the LDO regulator circuit may overshoot the desired voltage and create a glitch or spike in output voltage during power up. This unwanted overshoot voltage may damage the subsequent low-voltage circuit that uses LDO output as supply when $V_{DD}$ is high-voltage. This overshoot voltage also creates unwanted large voltage if the application needs constant smooth voltage. Therefore, there is a need to remove the overshoot voltage at LDO output during supply voltage power up.

SUMMARY

According to one embodiment there is provided, a voltage regulator circuit for supplying a voltage to an input of a subsequent circuit element, the voltage regulator circuit comprising: a power supply, an output adapted to deliver a regulated output voltage, a first transistor connected between the power supply and the output for controlling the output voltage, a differential amplifier configured to provide a feedback to the first transistor, a protective circuit which is coupled to the gate of the first transistor and configured to control the first transistor, such that the turn-on of the first transistor is delayed and any overshoot output voltage is avoided at the output during an initial charging up phase after the power supply is turned on.

In one example, the protective circuit provides a signal to the gate of the first transistor to depress the instantaneous voltage at the gate compared with the instantaneous voltage at the power supply.

In one example the protective circuit is coupled to the first transistor through a second transistor positioned with the drain of the second transistor connected to the first transistor, the source of the second transistor connected to the power supply, and the gate of the second transistor connected to the protective circuit.

In one example, the protective circuit generates a signal that pulls the voltage at the gate of the second transistor low, so that the second transistor is turned on.

In one example, the protective circuit generates the signal to the second transistor through a third transistor which is coupled between the bandgap voltage and the gate of the second transistor, such that the second transistor is turned on when the bandgap voltage is low.

In one example, the protective circuit further comprises an inverter which has an input of the bandgap voltage and an output to the gate of the third transistor.

In one example, the differential pair comprises two transistors connected through their two sources.

In one example, the two transistors comprises a first input of a reference voltage and a second input of a feedback voltage, and an output of control signal for the first transistor.

In one example, the voltage regulator further comprises a current mirror established between the power supply and the differential pair.

In one example, the voltage regulator further comprises an RC compensation circuit established between the gate and the drain of the first transistor.

In one example, the voltage regulator further comprises a current biasing component established between the differential pair and Ground.

In one example, the current biasing component comprising a large resistance.

In one example, the current biasing component comprises a current mirror.

According to another embodiment there is provided, a method of controlling a voltage regulator circuit for supplying a voltage to an input of a subsequent circuit element, the method comprising: coupling a protective circuit to a first transistor which is connected between a power supply and an output of the voltage regulator circuit, providing a signal from the protective circuit to the first transistor, such that the turn-on of the first transistor is delayed and any overshoot output voltage is avoided during the charging of the power supply.

In one example, the method of controlling a voltage regulator circuit further comprises providing a signal from the protective circuit to the gate of the first transistor to depress the instantaneous voltage at the gate compared with the instantaneous voltage at the power supply.

In one example, the method of controlling a voltage regulator further comprises operating the protective circuit by a bandgap voltage which is coupled between the bandgap voltage and the gate of the second transistor, such that the second transistor is turned on when the bandgap voltage is low.

In one example, the method of controlling a voltage regulator further comprises connecting an inverter between the bandgap voltage and the third transistor.

In one example, the differential pair comprises two transistors connected through their two sources.

According to another embodiment there is provided, an electronic device comprising a voltage regulator circuit for supplying a voltage to an input of a subsequent circuit element, the voltage regulator circuit comprising: a power supply, an output adapted to deliver a regulated output voltage, a first transistor connected between the power supply and the output for controlling the output voltage, a differential amplifier configured to provide a feedback to the first transistor, a protective circuit which is coupled to the gate of the first transistor and configured to control the first transistor, such that the turn-on of the first transistor is delayed and any overshoot output voltage is avoided at the output during an initial charging up phase after the power supply is turned on.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein are directed to A voltage regulator circuit for supplying a voltage to an input of a subsequent circuit element, the voltage regulator circuit comprising: a power supply, an output adapted to deliver a regulated output voltage, a first transistor connected between the power supply and the output for controlling the output voltage, a differential amplifier configured to provide a feedback to the first transistor, a protective circuit which is coupled to the gate of the first transistor and configured to control the first transistor, such that the turn-on of the first transistor is delayed and any overshoot output voltage is avoided at the output during an initial charging up phase after the power supply is turned on.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

A low-dropout voltage (LDO) regulator circuit is connected between a high-voltage power supply and a subsequent electrical circuit (or component) that requires a lower operating voltage, in order to regulate the voltage to the subsequent component at the required range. However, during Supply Voltage power up, the output voltage from the LDO circuit may exceed the required value and damage the subsequent component. Therefore, this invention relates to a modified LDO regulator circuit by adding a protective circuit for removing the overshoot voltage from the LDO output.

Bandgap voltage, normally referred to as bandgap voltage reference circuit, is a temperature independent voltage reference circuit widely used in integrated circuits. It produces a constant voltage regardless of power supply variations, temperature changes, or circuit loading from a device. As a matter of fact, bandgap voltages usually settle to their final value slower than supply voltages. Taking advantage of this property, a bandgap voltage is used to create control signals in the protective circuit before reaching its final voltage.

Figure 1:
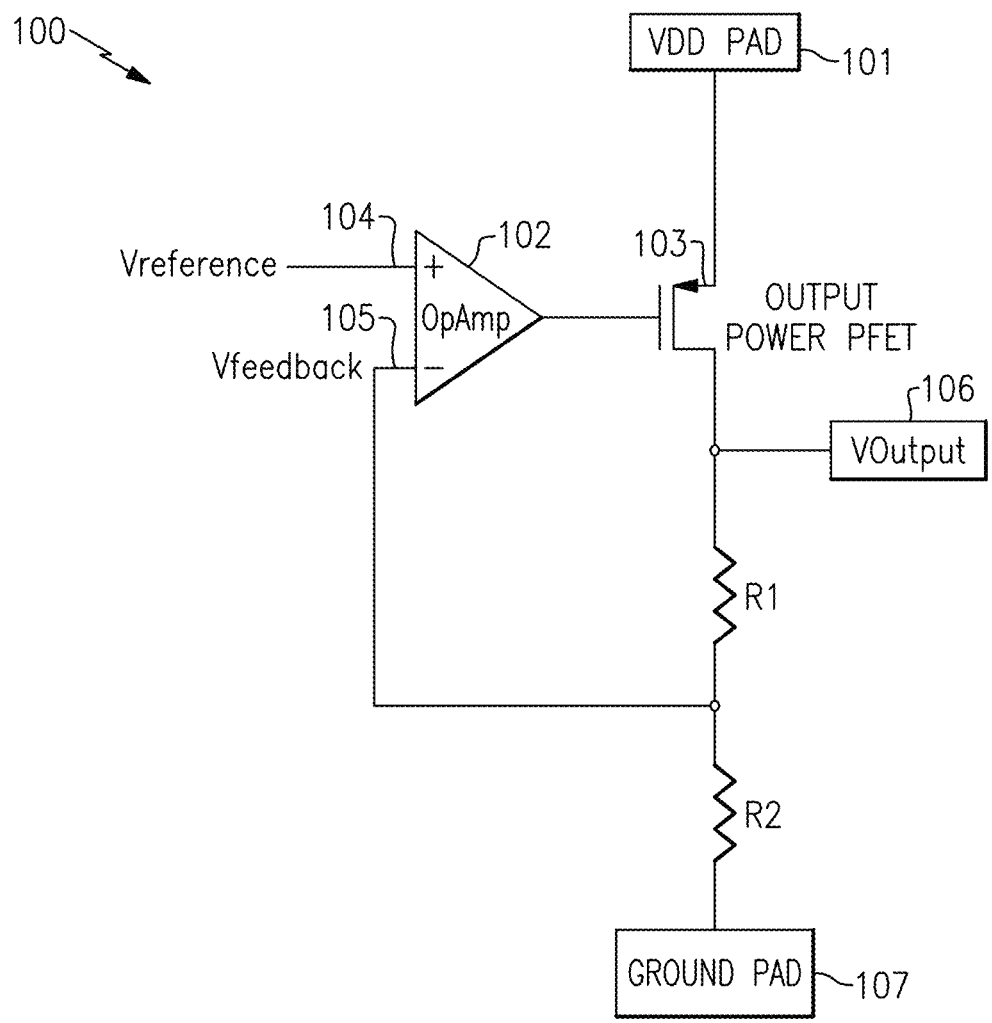
FIG. 1 is a schematic diagram of a conventional low dropout voltage regulator (LDO) according to aspects of the present invention.

Starting from a basic structure, a LDO voltage regulator without a protective circuit may comprise a $V_{DD}$, a differential amplifier, a power transistor, and a $V_{output}$. The differential amplifier may be an op-amp as shown in FIG. 1. In some embodiments, the differential amplifier may also be formed by transistors which is introduced in FIG. 2.

Figure 2:
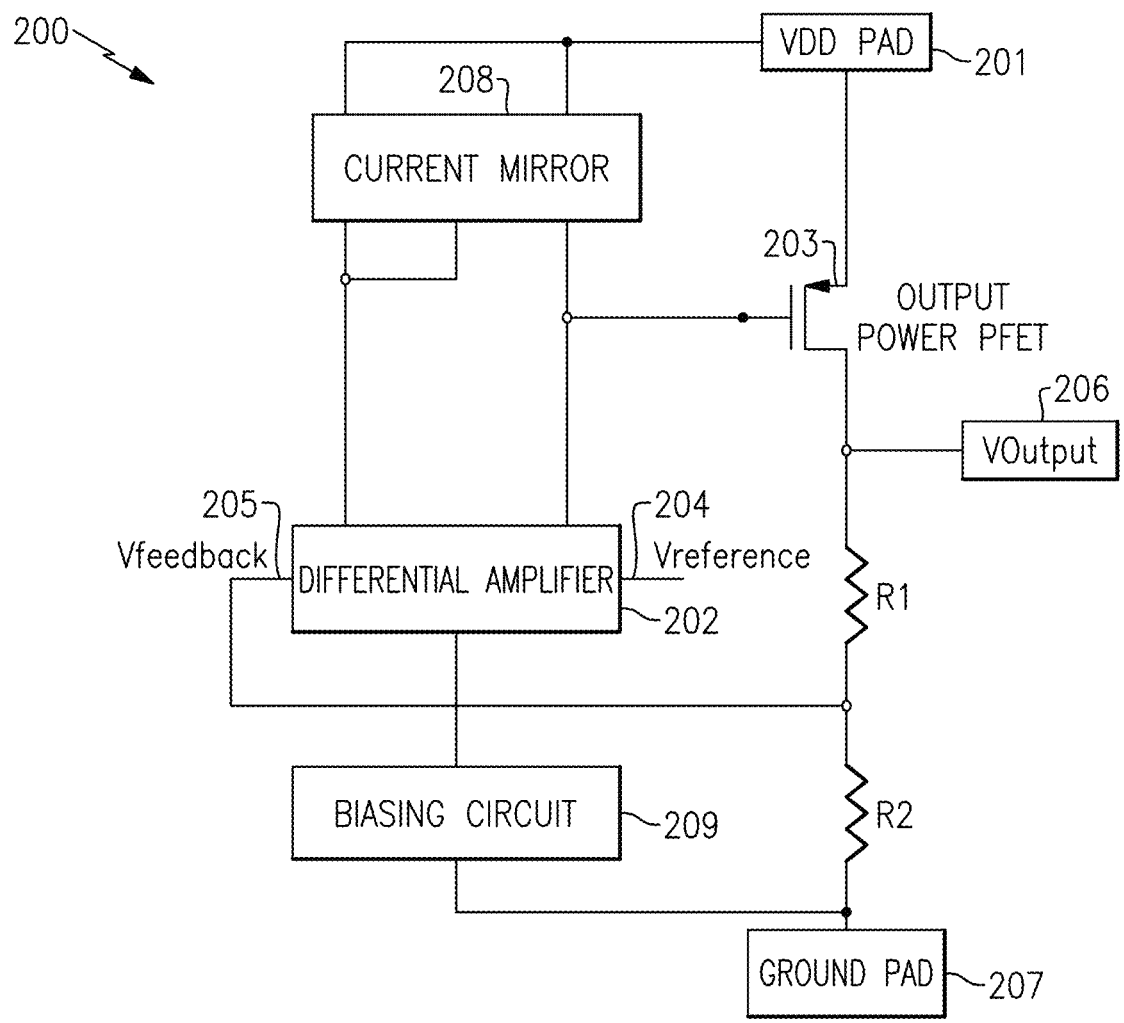
FIG. 2 is a schematic block diagram of a basic LDO regulator using transistors as a differential amplifier according to aspects of the present invention.

FIG. 2 shows a schematic block diagram of a LDO regulator circuit 200 which does not have a protective circuit. The LDO regulator circuit mainly includes a $V_{DD}$ 201, a differential pair 202, a power transistor 203, and a $V_{output}$ 206. The differential pair 202 may consist of two transistors (not shown) connected such that two inputs and two outputs are presented. The two inputs may be a reference voltage ($V_{REF}$) 204 and a feedback voltage ($V_{feedback}$) 205, respectively. In order to use one output end instead of two ends connecting to the gate of the power transistor 203, a current mirror 208 may be used to convert the output of the differential pair 202 into a single-ended output. A detailed circuit diagram is shown and introduced in FIG. 4.

The LDO regulator circuit 200 may also include two resistors R1 and R2 as a voltage divider. $V_{feedback}$ 205 then monitors the fraction of the output voltage determined by the resistor ratio of R1 and R2, and inputs to the differential pair 202.

In order to establish proper operating conditions for the differential pair 202, such as keeping the transistors operating in an active mode, a biasing circuit 209 may be used which is connected directly to the differential pair 202 as shown in FIG. 2. In some embodiments, the biasing circuit 209 may be a current source.

Figure 3:
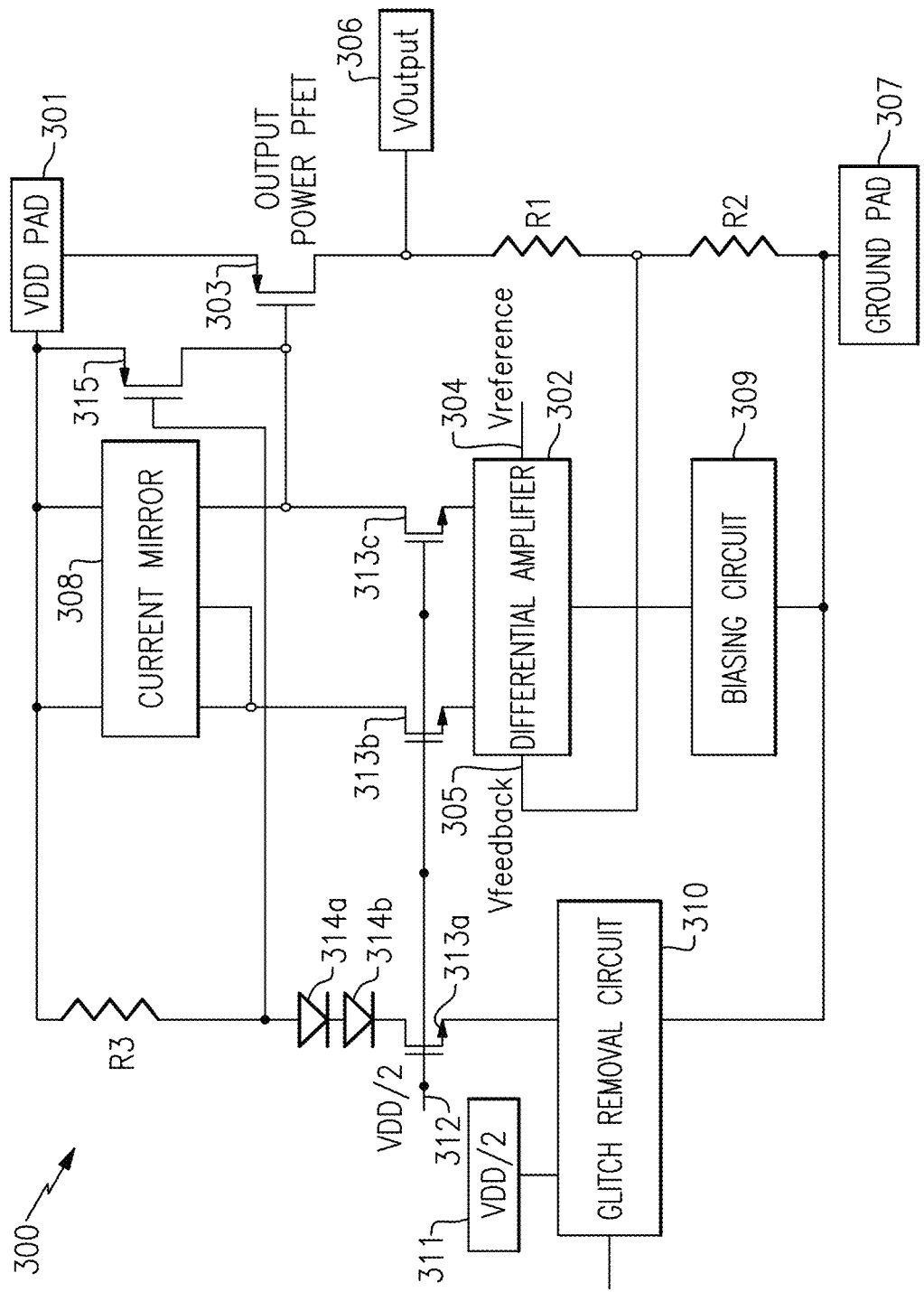
FIG. 3 is a schematic block diagram of a LDO regulator with a glitch removal circuit according to aspects of the present invention.

FIG. 3 shows a schematic block diagram of a circuit based on the LDO regulator 300 after adding a protective circuit for removing any overshoot voltage. The protective circuit may also be referred to as a 'Glitch Removal Circuit' in the following description. A Glitch Removal Circuit 310 is added to control a power transistor 303 of the LDO circuit. The control on the power transistor 303 may be via a controlling transistor 315 which may be established between a power supply 301 and the power transistor 303. The controlling transistor 315 may have its source connected to the power supply 301, drain connected to the gate of the power transistor 303, and gate connected to the Glitch Removal Circuit 310.

The Glitch Removal Circuit 310 may be operated by an external voltage supply of half $V_{DD}$ 311 ($V_{DD}/2$) as shown in FIG. 3. A bandgap voltage may be employed in this Glitch Removal Circuit 310 to create control signals to the controlling transistor 315, in order to have a control on the power transistor 303 which then regulates voltages at a $V_{output}$ 306. Detailed circuit diagrams are shown and described in FIGS. 6, 7 and 8.

In order to protect the entire LDO circuit, three cascading transistors 313a, 313b, and 313c may also be employed with their gates connected to another external voltage supply of half $V_{DD}$ 312 ($V_{DD}/2$). The transistor 313a is configured to connect to the Glitch Removal Circuit 310 through the source of the transistor 313a. The transistors 313b and 313c are configured to connect to the two transistors of the differential pair 302 through the sources of transistors 313b and 313c. Two diodes 314a and 314b may be added between the $V_{DD}$ and the transistor 313a. The two diodes 314a and 314b are connected in series as shown in FIG. 3 and the cathode of 314b is connected to the drain of transistor 313a. At the anode of diode 314a, a node is taken to connect to two different electrical components. One of the components may be a resistor R3 between the diode 314a and the main power supply $V_{DD}$ 301. The other one of the components may be a transistor 315 which comprises a gate connecting to the anode of diode 314a, a source connecting to $V_{DD}$ 301, and a drain connecting to the gate of a power transistor 303.

Figure 4:
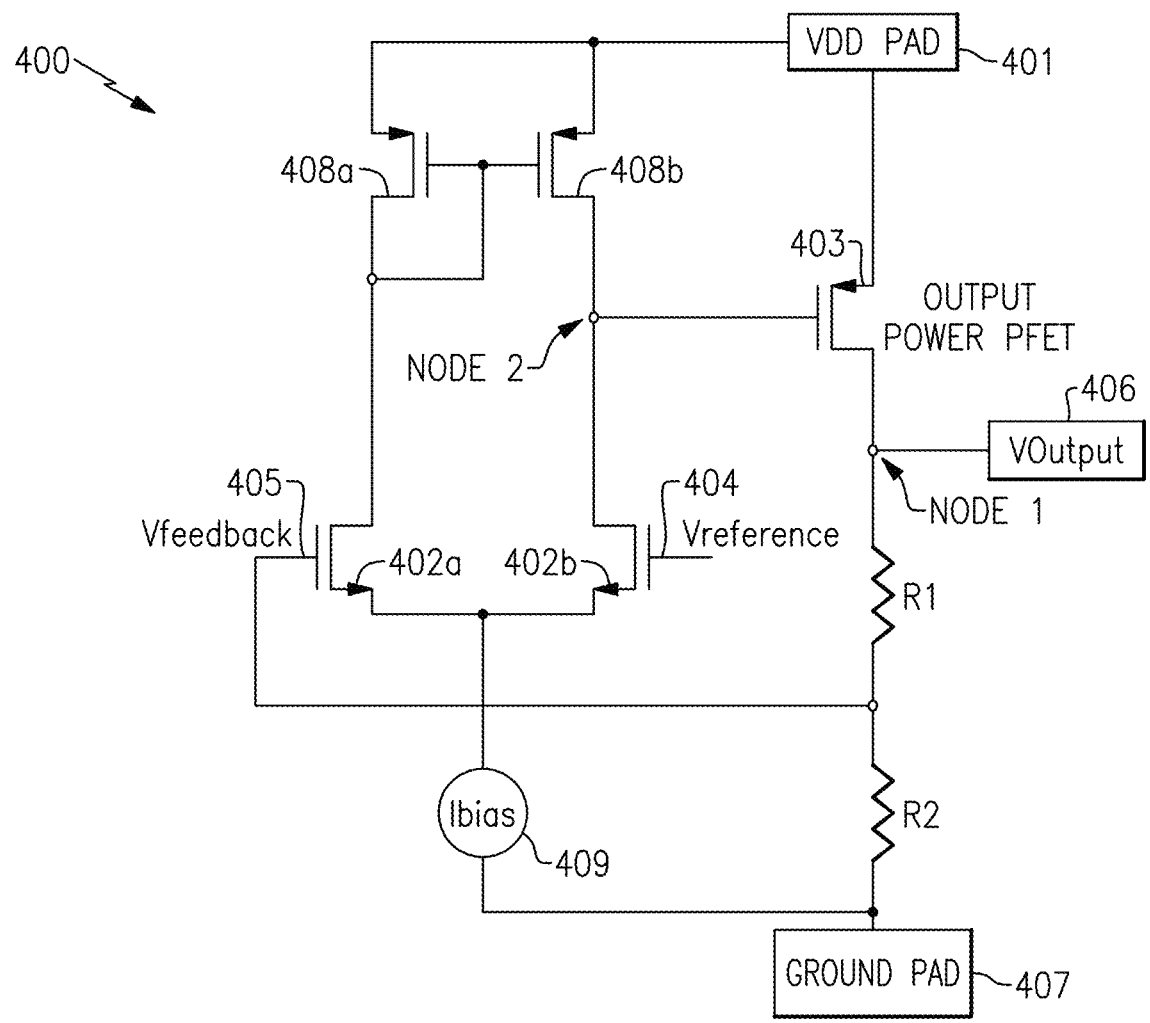
FIG. 4 is a detailed circuit diagram of a basic LDO regulator using transistors as a differential amplifier according to aspects of the present invention.
Figure 5:
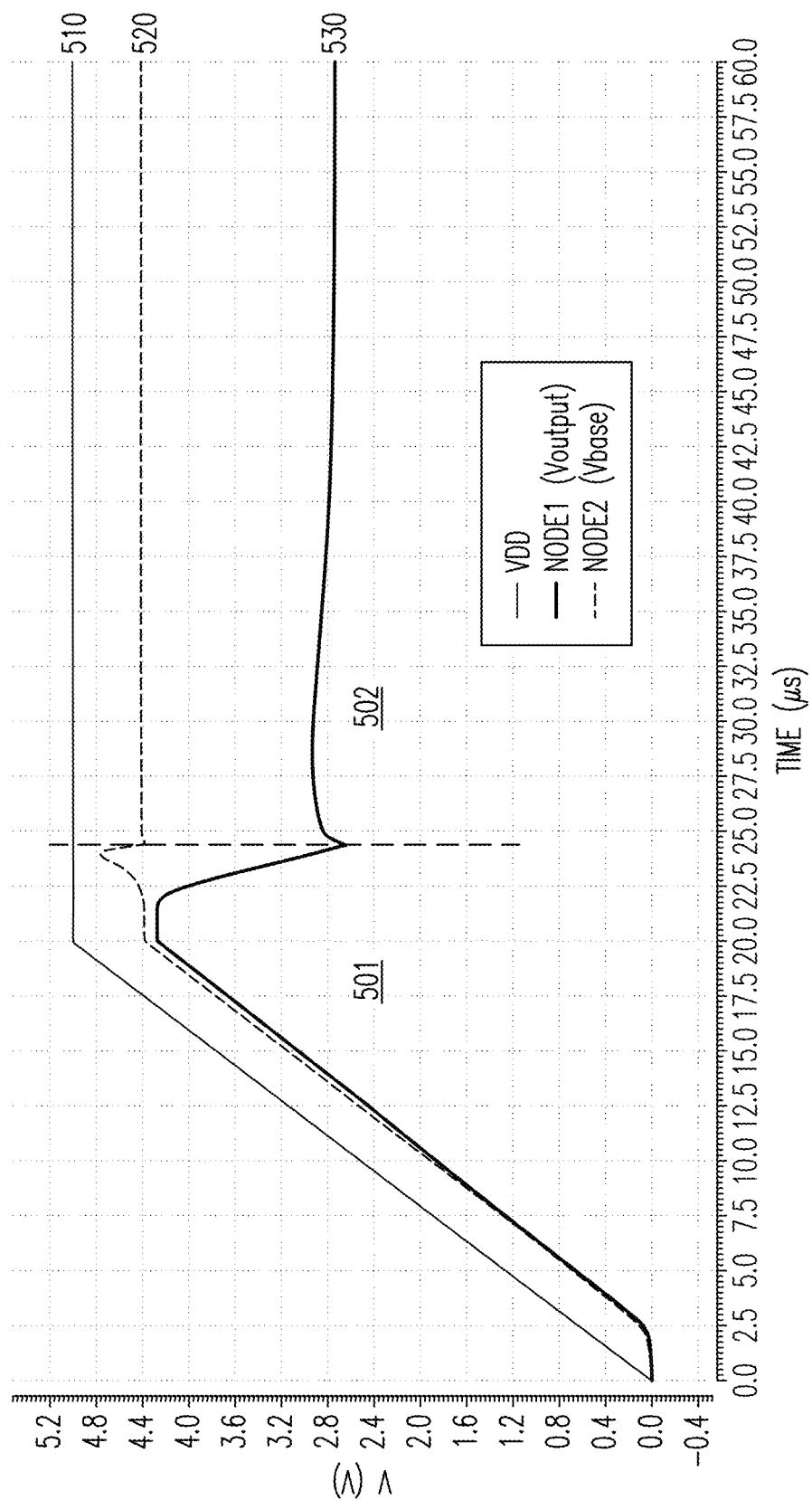
FIG. 5 is a simulation plot of the voltage change within the circuit shown in FIG. 4 at different notes, according to aspects of the present invention.
Figure 6:
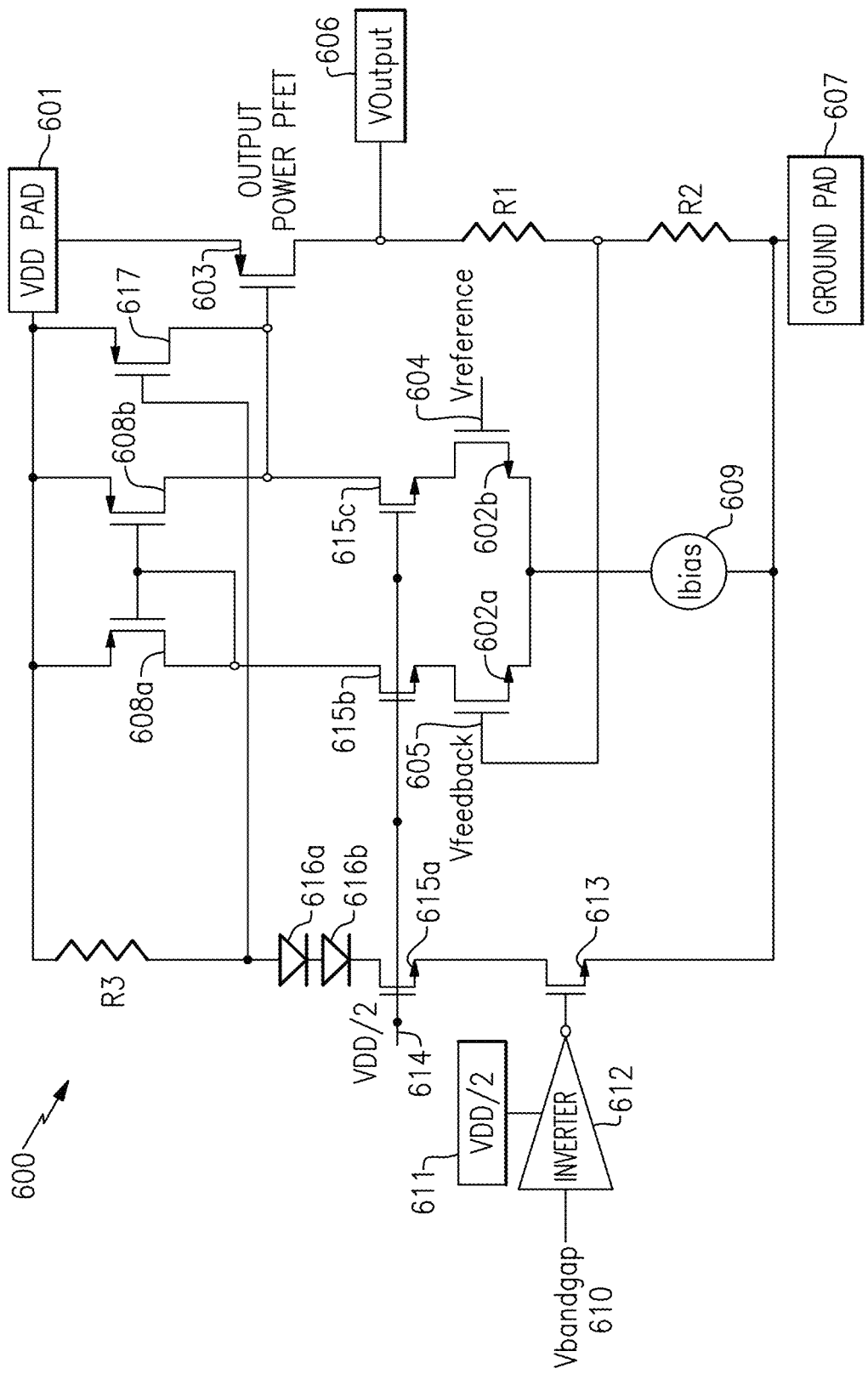
FIG. 6 is a detailed circuit diagram of a LDO regulator with a glitch removal circuit according to aspects of the present invention.
Figure 7:
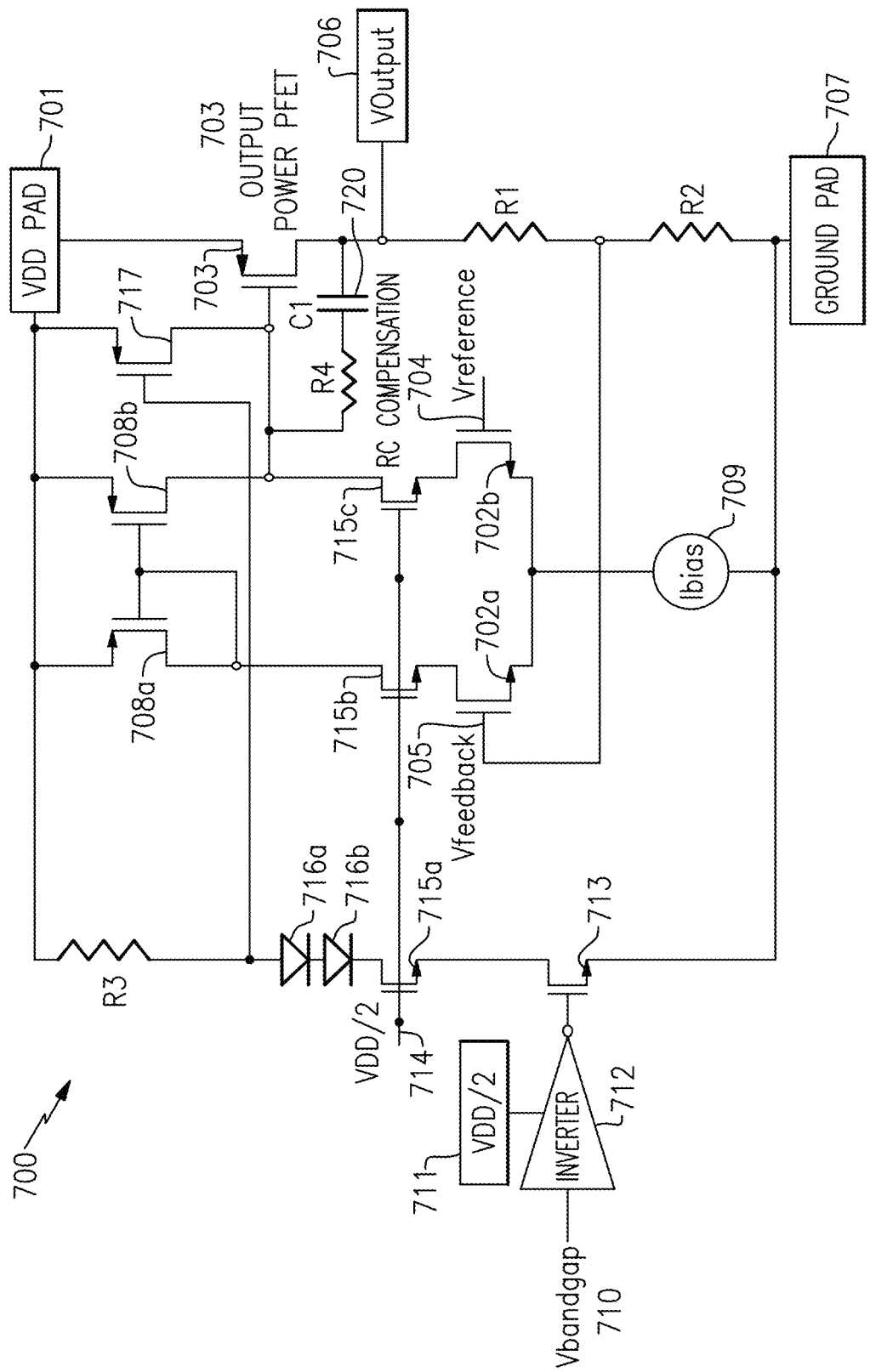
FIG. 7 is a detailed circuit diagram of the LDO regulator shown in FIG. 6 with an added RC compensation circuit according to aspects of the present invention.

A set of simulation is displayed to compare the LDO voltage regulator before and after incorporating a protective circuit. FIG. 4 shows a detailed circuit diagram of LDO regulator 400 that does not have a protective circuit. FIG. 5 then demonstrates the corresponding simulation results of electrical signals of the circuit shown in FIG. 4. FIG. 6 shows a detailed circuit diagram of a LDO regulator 600 with a protective circuit. FIG. 7 then demonstrates the corresponding simulation results of electrical signals of the circuit shown in FIG. 6. As an example, it is simulated that $V_{DD}$ is 5.0V and a maximum voltage of $V_{output}$ for a subsequent circuit is 3.0V for the following LDO circuits and the corresponding simulations.

In FIG. 4, the LDO regulator 400 includes a differential pair formed by two transistors 402a and 402b which are connected to each other through their sources. The gates of transistors 402a and 402b are two inputs of the differential pair, which are a reference voltage ($V_{REF}$) 404 and a feedback voltage ($V_{feedback}$) 405, respectively. The reference voltage 404 may consist of a circuit that provides a constant voltage value. In some embodiments, the circuit may be a bandgap voltage reference circuit.

The two sources of transistors 402a and 402b are connected to a current mirror circuit, in order to convert into a single-ended output. Conventionally, a differential amplifier using two transistors may have two outputs which are the two sources of the transistors. However, the differential amplifier used in the LDO regulator circuit 400 is configured to have one output end in order to control the gate of the power transistor 403. The output of the differential amplifier is then taken from one of the sources of transistors 402a and 402b and is subsequently connected to the gate of the power transistor 403. In such configuration, one problem may be that the gain of the differential amplifier is half that of the stage with two differential outputs. In order to solve this problem, a 'differential to single-ended converter' may be used which may be implemented as a current mirror.

A current mirror is normally used to copy or mirror the current flowing in one active device in another, keeping the output current constant regardless of loading. Current mirrors are designed with low input impedance to minimize input voltage variations and provide high output impedance to reduce variations caused by load. As shown in FIG. 4, the current mirror circuit comprises two main transistors 408a and 408b. Transistor 408a has its gate and drain connected. The gate of both transistors are then linked. In some embodiments, more than two transistors may also be used to enable the level of performance to be improved.

The two sources of transistors 402a and 402b are connected together at a node which is then taken to Ground (GND) via a current biasing component 409. The configuration of two transistors as a differential pair with a current bias may resemble a classic long-tailed pair circuit. In some embodiments, the current bias 409 may be a resistor. The resistor may have a high resistance value, such that as a result it resembles a current source. In some embodiments, such as in many integrated circuit applications where further transistors can be added very easily, the current source may be any active current source to improve its performance.

When the differential amplifier is operating, if the two inputs are equal, no difference is detected between the inputs, therefore no output is seen. If there is difference between the two inputs, a corresponding level of signal is output. The level of the output may be determined mainly by any lack of balance in the circuit. The output signal is then applied to the gate of the power transistor 403. The conduction path of the power transistor 403 may be altered which leads to an adjustment of the output voltage supplied from $V_{DD}$ 401 to $V_{output}$ 406. In some embodiments, the power transistor 403 may be a p-channel field-effect transistor (PFET).

The voltage changes throughout the LDO circuit are illustrated during the Supply Voltage power up. FIG. 5 shows a simulation result of the voltage changes at $V_{DD}$ 401 and at two different nodes chosen in the LDO circuit in FIG. 4. The two selected nodes, namely Node 1 and Node 2 are labeled in the LDO circuit in FIG. 4.

The simulation result shows the voltage changes with respect to time. The time axis has been divided into two regions, namely a first time period 501 and a second time period 502 as shown in FIG. 5. Curve 510 presents the voltage change of $V_{DD}$, curve 520 presents the voltage change of Node 2 ($V_{gate}$), and curve 530 presents the voltage change of Node 1 ($V_{output}$). As can be seen in FIG. 5, curve 510 shows that $V_{DD}$ is powered up from 0V to 5V (fully-charged) within the first 20 µs and stabilizes at 5V in the first time period 501. The value of $V_{DD}$ is then maintained continuously at 5V in second time period 502. After a 2.5 µs delay, the voltage at Node 2 ($V_{gate}$) begins to continuously follow the ramping up shape of $V_{DD}$, changing from 0V to 4.4V in the first time period 501. At the same time, the voltage change at Node 1 ($V_{output}$) shown by curve 520 follows that of Node 2 ($V_{gate}$), continuously ramping up to approximately 4.3V. A suddenly drop in $V_{output}$ can then be seen at the time around 22.5 µs, shown by curve 530.

This indicates that the output of the differential amplifier which controls the gate of the power transistor 403 fails to pull down the continuously increasing $V_{output}$ until at around 22.5 µs. However, $V_{output}$ has already exceeded the maximum 3.0V before the sudden drop at 22.5 µs.

As shown by curve 520 in FIG. 5, a spike occurs after 22.5 µs at Node 2 ($V_{gate}$). This indicates that a voltage signal, as a reflection of the unbalanced inputs ($V_{feedback}$ and $V_{REF}$), is output from the differential amplifier which controls the gate of the power transistor 403 and then regulates $V_{output}$. This then brings down $V_{output}$ lower than 3V at around 24.5 µs and stabilizes the voltage at around 2.8V throughout the second time period 502.

Assuming a maximum of 3V output voltage is desired for a subsequent circuit from the LDO regulator circuit, $V_{output}$ exceeds the 3V threshold from roughly 15 µs after the power supply is turned on at t=0 s. In real-world practice, this overshoot of output voltage may damage the subsequent circuit, before the voltage is able to be stabilized at 2.8V. Therefore, the overshoot of output voltage, also called a 'glitch' of the LDO regulator circuit is to be removed during the power up of $V_{DD}$.

FIG. 6 shows a detailed circuit diagram of a LDO regulator circuit 600 that has a protective circuit (also referred to as a 'Glitch Removal Circuit'). As also disclosed in FIG. 3, a Glitch Removal Circuit is added to control a power transistor 603 of the LDO circuit. The control on the power transistor 603 may be via a controlling transistor 617 which may be established between a power supply 601 and the power transistor 603. The controlling transistor 617 may have its source connected to the power supply 601, drain connected to the gate of the power transistor 603, and gate connected to the Glitch Removal Circuit.

As shown in FIG. 6, a Glitch Removal Circuit includes a bandgap voltage reference circuit 610, an external voltage supply of half $V_{DD}$ 611 ($V_{DD}/2$), an inverter 612 and an operating transistor 613. These components of the Glitch Removal Circuit are configured that the inverter 612 has an input of the bandgap voltage reference 610 and an output to the gate of the operating transistor 613, and is powered by the external voltage supply 611.

In order to protect the entire LDO circuit, three cascading transistors 615a, 615b, and 615c may also be employed with their gates connected to another external voltage supply of half $V_{DD}$ 614 ($V_{DD}/2$). The transistor 615a is configured to connect to the drain of the operating transistor 613 through its source. The transistors 615b and 615c are configured to connect to the drains of transistors 602a and 602b through their sources. Two diodes 616a and 616b may be added between $V_{DD}$ 601 and the transistor 615a. This guarantees transistors 613 and 615a to operate in their safe operating area, not exceeding their breakdown voltage. The two diodes 616a and 616b are connected in series and the cathode of 616b is connected to the drain of transistor 615a. At the anode of diode 616a, a node is taken to connect to two different electrical components. One of the components may be a resistor R3 between the diode 616a and the main power supply $V_{DD}$ 601 in order to create a small bias current for transistor 613. The other one of the components may be a transistor 617 which comprises a gate connecting to the anode of diode 616a, a source connecting to $V_{DD}$ 601, and a drain connecting to the gate of a power transistor 603.

FIG. 7 shows a detailed circuit diagram of a LDO regulator circuit based on the circuit shown in FIG. 6 with an added resistor-capacitor (RC) compensation circuit. The RC compensation circuit may be added at the output of the differential amplifier which is between the gate and drain of the power transistor 703 as shown in FIG. 7. The RC compensation circuit includes a resistor R4 and a capacitor C1 connected in series. The purpose for adding this RC compensation circuit is to compensate the differential amplifier in terms of frequency response and improve the stability of the amplifier.

Figure 8:
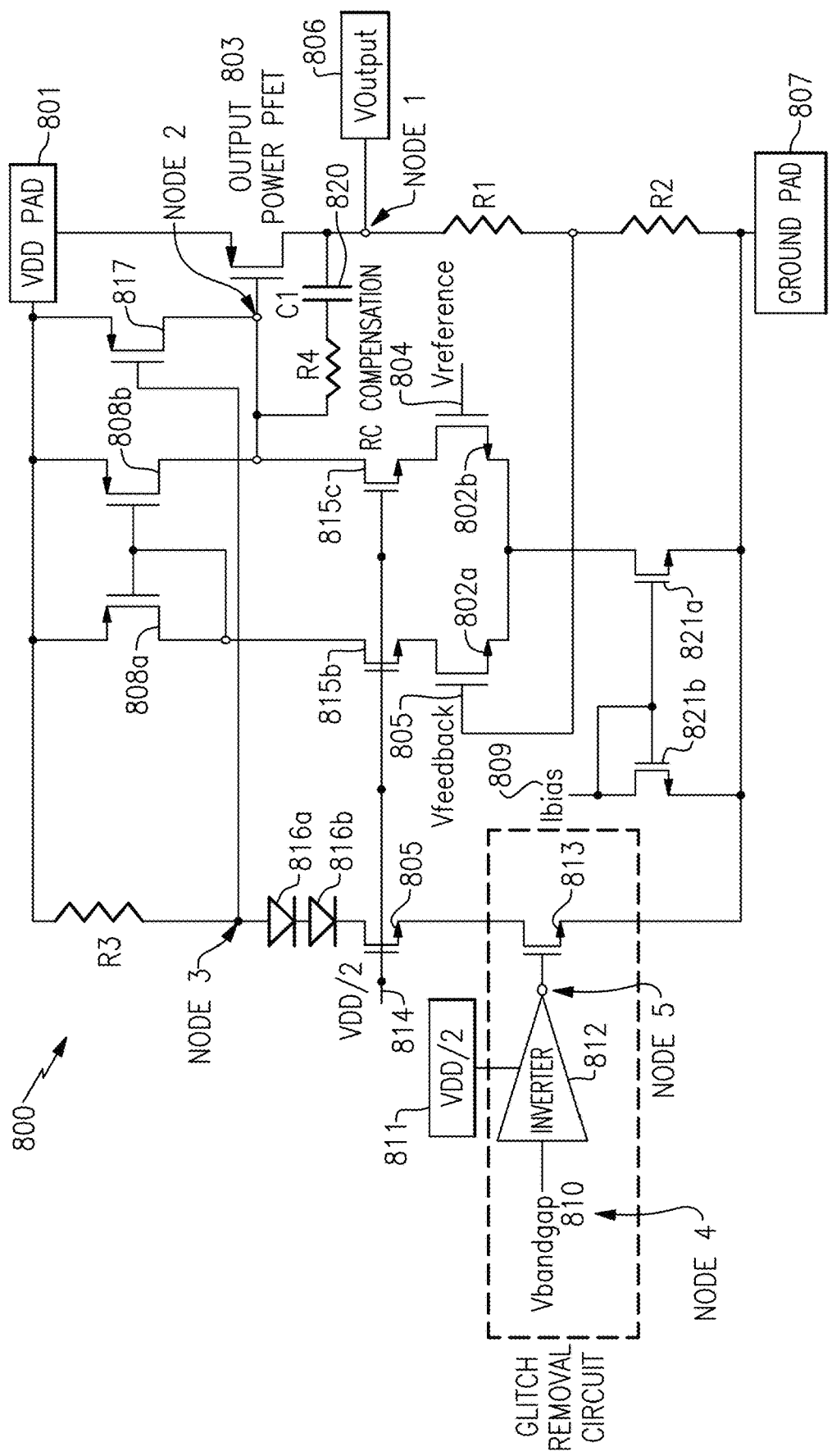
FIG. 8 is a detailed circuit diagram of the LDO regulator shown in FIG. 7 with a detailed current bias circuit according to aspects of the present invention.

FIG. 8 shows a detailed circuit diagram of a LDO regulator circuit based on the circuit shown in FIG. 6 with a detailed example of a biasing circuit. A biasing circuit 809 may be formed by a current mirror consisting of two transistors 821a and 821b. The gates of transistors 821a and 821b are connected and the drain of transistor 821b is connected to its gate. One transistor 821a is connected to the node at which the sources of differential transistors 802a and 802b are connected. Another transistor 821b is connected to an external circuit or current source for providing the $I_{bias}$. In some embodiments, the $I_{bias}$ circuit 809 may also be a resistor with a large resistance.

Figure 9:
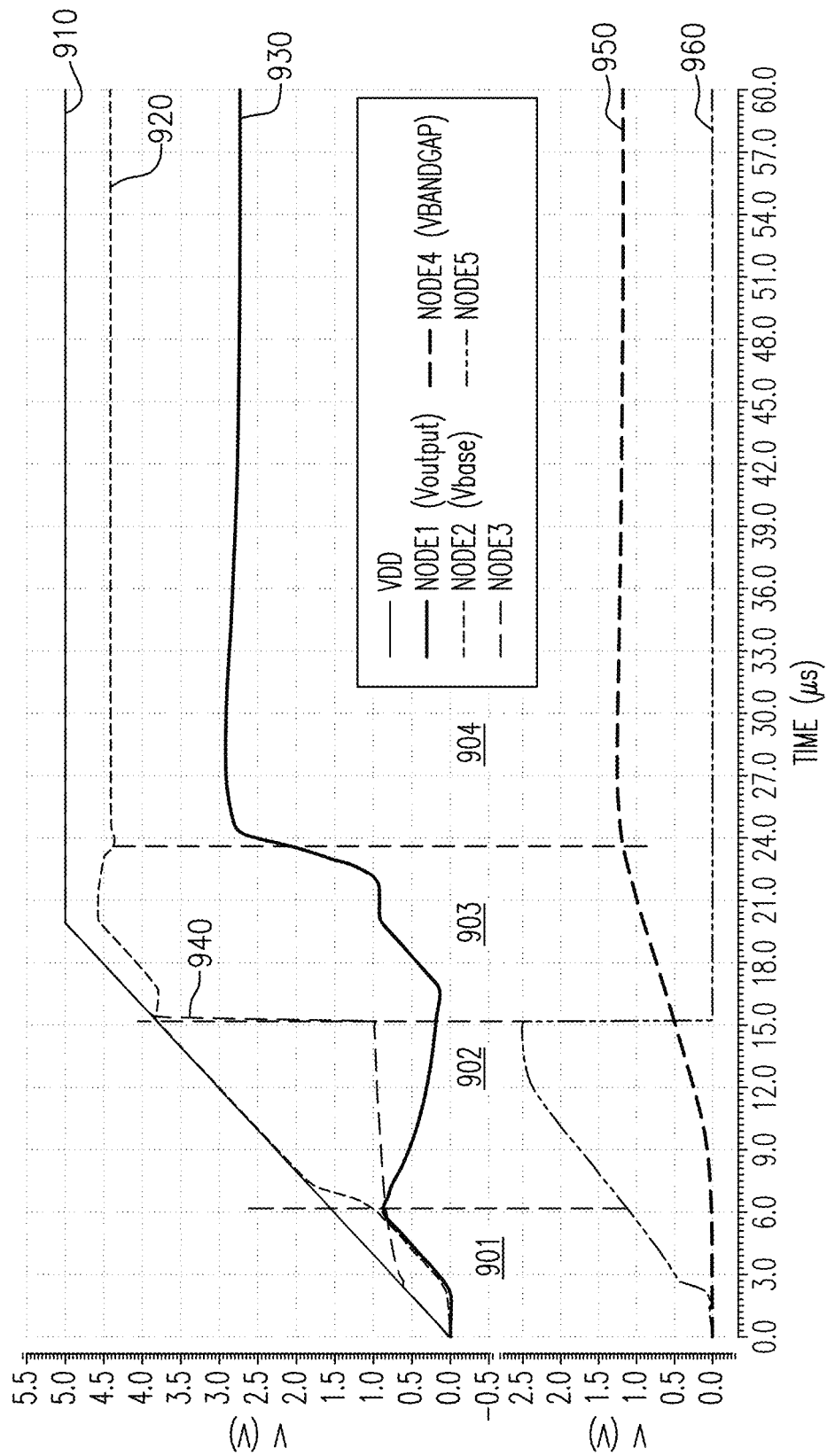
FIG. 9 is a simulation plot of the voltage change within the circuit shown in FIG. 8 according to aspects of the present invention.

FIG. 9 shows a simulation result of the voltage changes throughout the LDO circuit as demonstrated in FIG. 8 at $V_{DD}$ 801 and five different nodes chosen in the LDO circuit in FIG. 8. The five selected nodes, namely Node 1, Node 2, Node 3, Node 4, and Node 5 are labeled in the LDO circuit in FIG. 8. Node 1 is at the output of the LDO regulator circuit 800, which is the $V_{output}$ of the circuit. Node 2 is at the gate of the power transistor 803, also referred to as $V_{gate}$. Node 3 is at the gate of the transistor 817. Node 4 is at the bandgap voltage reference, which is also referred to as $V_{bandgap}$. Node 5 is at the output of the inverter 812, which is also the gate of the operating transistor 813.

As can be seen in FIG. 9, the simulation result shows the voltage changes with respect to time. The plot is divided into four time periods according to different stages of the output voltage of the LDO circuit 800, namely the first time period 901, the second time period 902, the third time period 903 and the fourth time period 904. During the first time period 901, $V_{DD}$ is charged from 0V as shown by curve 910. At this stage, there is no influence on $V_{output}$ from the Glitch Removal Circuit. $V_{output}$ (Node 1) and $V_{gate}$ (Node 2) both simply follow this ramping up shape of the $V_{DD}$ voltage, as revealed by curve 920 and curve 930 in FIG. 9. As shown by curve 950, $V_{bandgap}$ stays at 0V within the whole first time period 901. This is due to the fact that bandgap circuits are not operational during time period 901. At the same time, the inverter 812 starts to show voltage signal from 3.0 μs as revealed by curve 960 in FIG. 9.

As the voltage signal from the inverter 812 reaches a critical value, the Glitch Removal Circuit may be turned on. This stage is labeled as the second time period 902 in FIG. 9. During this period of time, $V_{output}$ of the LDO circuit 800 no longer follows the ramping up shape of $V_{DD}$. The Glitch Removal Circuit may start to function by pulling down $V_{output}$. As demonstrated by curve 960, the voltage at Node 5, which is the output of the inverter 812, reaches 1.0V at the time around 6.0 μs. This then turns on the operating transistor 813 which pulls down the voltage at Node 3. As a control of the gate of transistor 817, Node 3 may turn on transistor 817 when it is pulled to low. Therefore, the voltage at Node 2 (the gate voltage of power transistor 803) may be pulled to $V_{DD}$ which may then turn off the power transistor 803. As a result, $V_{output}$ may be pulled down to nearly 0V as shown by curve 930. This is in contrast with the overshoot voltage shown in FIG. 5 where $V_{output}$ keeps following the ramping up shape of $V_{DD}$ and exceeds the maximum voltage (e.g. 3V).

As the bandgap voltage settles gradually to its final value, the Glitch Removal Circuit is then turned off accordingly. This stage is labeled as the third time period 903 in FIG. 9. During this period of time, $V_{output}$ of the LDO circuit 800 follows $V_{DD}$ again and settles towards its final value. As shown by curve 950, $V_{bandgap}$ keeps increasing from 0.5V at 15.0 μs to 1.2V at 24.0 μs during the third time period 903. 1.2V may be the final voltage value of $V_{bandgap}$. While $V_{bandgap}$ reaching to its highest voltage value, the voltage outputting from the inverter 812 (at Node 5) is inversely shifted to 0V at 15.0 μs, and stays at 0V for the rest of the time as shown by curve 960. At the same time, the voltage at Node 3 is then put to high and follows $V_{DD}$ again as shown by curve 940. Therefore, the high voltage at Node 3 turns off the transistor 817 which means the transistor 817 does not have control of the power transistor 803 anymore. As a result, the $V_{gate}$ (Node 2) and $V_{output}$ (Node 1) both start to follow $V_{DD}$ again and settles towards their final values as demonstrated by curve 920 and 930, respectively. However, $V_{output}$ follows the ramping up shape of $V_{DD}$ from around 0V to 2.0V during the third time period 903 which still does not exceed the maximum voltage (e.g. 3V).

During the fourth time period 904, $V_{DD}$ reaches its fully-charged state and remains at 5.0V (curve 910). Although the Glitch Removal Circuit has turned off, the overshoot voltage of $V_{output}$ has already been removed at the third time period 903 and the power transistor 803 continuously settles towards its final value at around 24.0 μs which appropriately regulates $V_{output}$ to 3.0V or lower (curve 930).

Figure 10:
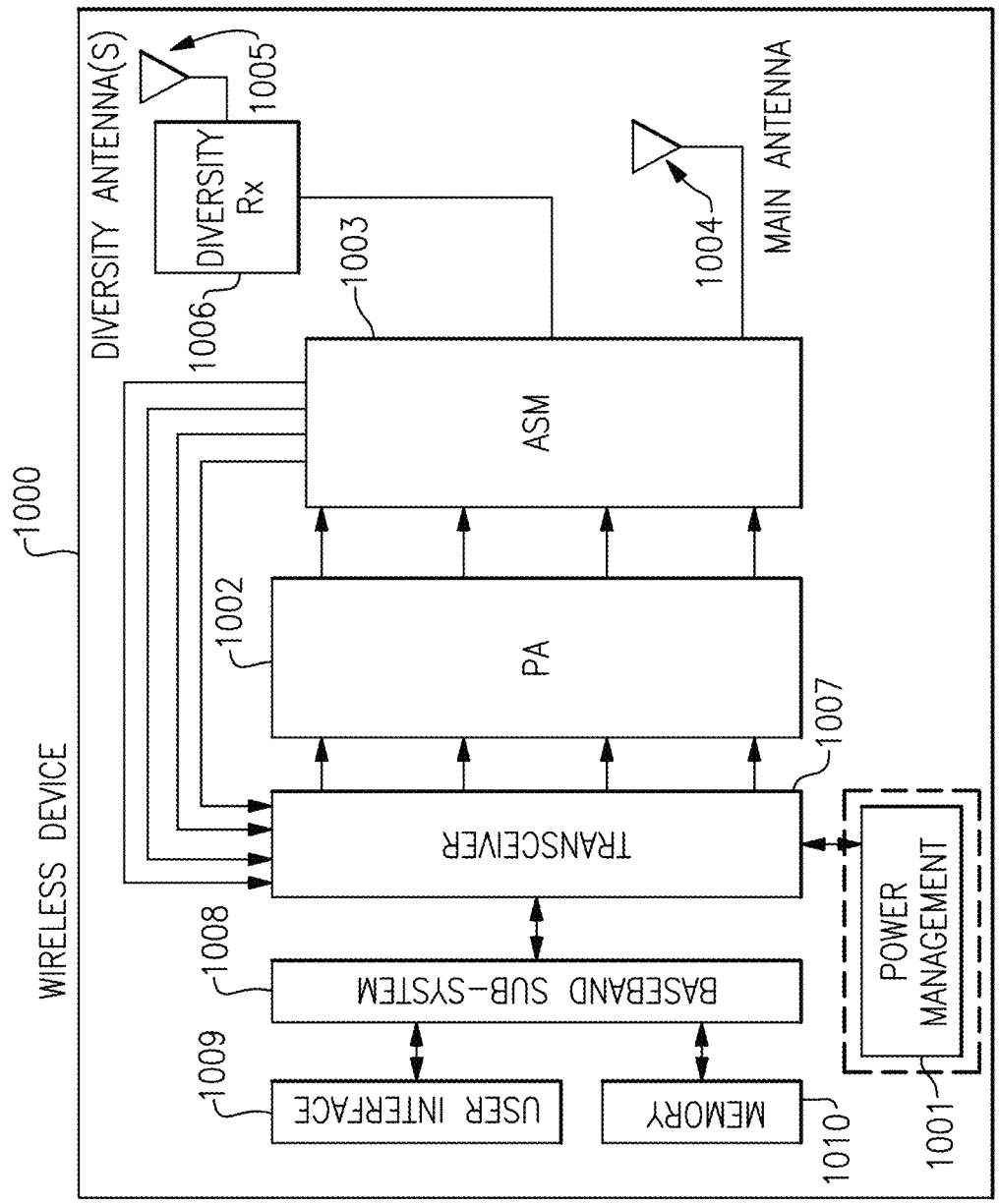
FIG. 10 is a schematic block diagram showing an application of the LDO regulator within a wireless device according to aspects of the present invention.

LDO regulator circuits may be used in various power management components, such as in wired or wireless applications where low noise constant voltages are required for various control needs. FIG. 10 shows an example of application in a wireless radio frequency (RF) device 1000. The wireless device 1000 comprises a power amplifier (PA) module 1002 and an antenna switch module (ASM) 1003 which is connected to a main antenna 1004 and a diversity antennas 1005 through the diversity Rx module 1006, respectively. Power amplifiers in PA module 1002 may receive their respective RF signals from a transceiver 1007 that can be configured and operated to generate RF signals to be amplified and transmitted, and to process received signals. The transceiver is shown to interact with the baseband sub-system 1008 that is configured to provide conversion between data and/or voice signals suitable for a user and RF signals suitable for the transceiver 1007. The baseband sub-system 1008 is connected to a user interface 1009 to facilitate various input and output of voice and/or data provided to and received from the user. The baseband sub-system 1008 can also be connected to a memory 1010 that is configured to store data and/or instructions to facilitate the operation of the wireless device, and/or to provide storage of information for the user.

The transceiver 1007 is also shown to be connected to a power management component 1001. The LDO circuit according to the present disclosure may be used in this power management block 1001 which is configured to manage power for the operation of the transceiver 1007. Such power management 1001 can also control operations of the baseband sub-system 1008 and other components of the wireless device 1000.

Such wireless device can include, for example, a cellular phone, a smart-phone, a hand-held wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

The transistors used in the present invention are field-effect transistors (FETs), which may be replaced by bipolar junction transistors (BJTs).

The invention claimed is:
1. A voltage regulator circuit for supplying a voltage to an input of a subsequent circuit element, the voltage regulator circuit comprising:
a power supply;
an output adapted to deliver a regulated output voltage;

a first transistor connected between the power supply and the output for controlling the regulated output voltage;
a differential amplifier configured to provide a feedback from the output to the first transistor; and
a protective circuit which is coupled through a second transistor to the first transistor and is configured to control the first transistor, such that a turn-on of the first transistor is delayed and any overshoot output voltage is avoided at the output during an initial charging up phase after the power supply is turned on, the second transistor connected between the power supply and the first transistor, the protective circuit configured, through a third transistor, to turn on the second transistor, the third transistor coupled between a bandgap voltage and a control input of the second transistor.

2. The voltage regulator circuit of claim 1 wherein the protective circuit provides a signal to a control input of the first transistor to depress an instantaneous voltage at the control input compared with the instantaneous voltage at the power supply.

3. The voltage regulator circuit of claim 2 wherein the second transistor is positioned with a drain of the second transistor connected to the first transistor, a source of the second transistor connected to the power supply, and a gate of the second transistor connected to the protective circuit.

4. The voltage regulator circuit of claim 3 wherein the protective circuit generates a signal that pulls the voltage at the gate of the second transistor low, so that the second transistor is turned on.

5. The voltage regulator circuit of claim 4 wherein the second transistor is turned on when the bandgap voltage is low.

6. The voltage regulator circuit of claim 1 wherein the protective circuit further includes an inverter which has an input connected to the bandgap voltage and an output connected to a control input of the third transistor.

7. The voltage regulator circuit of claim 1 wherein the differential amplifier includes a differential pair that includes two transistors connected through their two sources.

8. The voltage regulator circuit of claim 7 wherein the two transistors comprise a first input of a reference voltage and a second input of a feedback voltage, and an output of control signal for the first transistor.

9. The voltage regulator circuit of claim 1 further comprising a current mirror established between the power supply and a differential pair of the differential amplifier.

10. The voltage regulator circuit of claim 1 further comprising an RC compensation circuit established between a gate and a drain of the first transistor.

11. The voltage regulator circuit of claim 1 further comprising a current biasing component established between a differential pair of the differential amplifier and Ground.

12. The voltage regulator circuit of claim 11 wherein the current biasing component includes a large resistance.

13. The voltage regulator circuit of claim 11 wherein the current biasing component includes a current mirror.

14. A method of controlling a voltage regulator circuit for supplying a voltage to an input of a subsequent circuit element, the method comprising:
coupling a protective circuit to a first transistor through a second transistor, the first transistor connected between a power supply and an output of the voltage regulator circuit, the second transistor connected between the power supply and the first transistor;
operating the protective circuit by a bandgap voltage, an output of the protective circuit coupled to a control input of the second transistor; and
providing a signal from the protective circuit through the second transistor to the first transistor, such that a turn-on of the first transistor is delayed and any overshoot output voltage is avoided during charging of the power supply.

15. The method of controlling a voltage regulator circuit of claim 14 further comprising providing the signal from the protective circuit to a gate of the first transistor to depress an instantaneous voltage at the gate of the first transistor compared with the instantaneous voltage at the power supply.

16. The method of controlling a voltage regulator of claim 15 wherein the second transistor is positioned such that a drain of the second transistor is connected to the first transistor, a source of the second transistor connected to the power supply, and a gate of the second transistor connected to the protective circuit.

17. The method of controlling a voltage regulator of claim 16 further comprising generating a signal, by the protective circuit, that pulls the voltage at the gate of the second transistor low, so that the second transistor is turned on.

18. The method of controlling a voltage regulator of claim 17 wherein the second transistor is turned on when the bandgap voltage is low.

19. The method of controlling a voltage regulator of claim 14 further comprising connecting an inverter between the bandgap voltage and a third transistor.

20. The method of controlling a voltage regulator of claim 14 further comprising, with a differential amplifier including a differential pair of transistors, providing a feedback from the output to the first transistor, the differential pair of transistors including two transistors connected through their two sources.

21. An electronic device comprising a voltage regulator circuit for supplying a voltage to an input of a subsequent circuit element, the voltage regulator circuit comprising:
a power supply;
an output adapted to deliver a regulated output voltage;
a first transistor connected between the power supply and the output for controlling the regulated output voltage;
a differential amplifier configured to provide a feedback to the first transistor; and
a protective circuit which is coupled through a second transistor to a control input of the first transistor and is configured to control the first transistor, such that a turn-on the first transistor is delayed and any overshoot output voltage is avoided at the output during an initial charging up phase after the power supply is turned on, the second transistor connected between the power supply and the first transistor, the protective circuit having an input connected to a bandgap voltage and an output connected to the second transistor.

* * * * *